United States Patent [19]

Foster, Jr. et al.

[11] 4,308,115

[45] Dec. 29, 1981

[54] METHOD OF PRODUCING ALUMINUM USING GRAPHITE CATHODE COATED WITH REFRACTORY HARD METAL

[75] Inventors: Perry A. Foster, Jr., New Kensington; Subodh K. Das, Apollo; Aaron J. Becker, Monroeville, all of Pa.

[73] Assignee: Aluminum Company of America, Pittsburgh, Pa.

[21] Appl. No.: 178,546

[22] Filed: Aug. 15, 1980

[51] Int. Cl.³ .......................... C25C 3/00; C25C 3/06; C25C 7/02
[52] U.S. Cl. .................................. 204/67; 204/64 R; 204/290 R; 204/294
[58] Field of Search .................. 204/64 R, 67, 290 R, 204/294, 243 R

[56] References Cited

U.S. PATENT DOCUMENTS

| | | | |
|---|---|---|---|
| 2,997,744 | 8/1961 | Stoddard et al. | 204/294 |
| 3,156,639 | 11/1964 | Kibby | 204/243 R |
| 3,400,061 | 9/1968 | Lewis et al. | 204/243 R |
| 3,471,380 | 10/1969 | Bullough | 204/294 |
| 3,492,208 | 1/1970 | Seager | 204/67 |
| 3,856,650 | 12/1974 | Kugler et al. | 204/243 R |
| 3,880,729 | 4/1975 | Kellner | 204/39 |
| 4,071,420 | 1/1978 | Foster et al. | 204/67 |
| 4,093,524 | 6/1978 | Payne | 204/67 |
| 4,121,983 | 1/1978 | Kinosz et al. | 204/67 |

OTHER PUBLICATIONS

Government Report SAND78-1794C, The Chemical Vapor Deposition of TiB₂ on Graphite, Pierson et al.

*Primary Examiner*—Howard S. Williams
*Attorney, Agent, or Firm*—Carl R. Lippert

[57] ABSTRACT

A metal such as aluminum is produced by electrolysis of a compound of the metal in a solvent such as a molten salt. Electrolysis is carried out by passing a current from an anode to a cathode between which the solvent bath is situated. The cathode or cathode member is composed of a graphite substrate coated with a refractory hard metal such as titanium diboride. The coating adhesion of the $TiB_2$ is improved through control of the manufacture and structure of the graphite substrate to favor a higher coefficient of thermal expansion and to have the density of the graphite fall within a range of 1.6 to 1.85 grams per cubic centimeter. The steps in producing the graphite may include working it so as to provide a grain direction. One embodiment includes aligning the refractory hard metal coated graphite in the electrolytic cell with the graphite grain direction parallel to the direction of current flow from anode to cathode. The refractory hard metal coating can be imparted by chemical vapor deposition and should exhibit a dense columnar structure which reduces penetration of the coating by molten aluminum.

31 Claims, 3 Drawing Figures

METHOD OF PRODUCING ALUMINUM USING GRAPHITE CATHODE COATED WITH REFRACTORY HARD METAL

BACKGROUND OF THE INVENTION

The invention relates to the production of a metal, such as aluminum, by electrolysis of a compound of the metal and in particular to the production of aluminum by electrolysis of a compound thereof, such as chloroaluminate of fluoroaluminate. More particularly, the invention relates to graphite cathode electrodes used in such electrolytic cells, the electrodes being coated with a refractory hard metal, such as $TiB_2$, and to the selective conditioning of the graphite substrate to enhance the adhesion of the refractory hard metal coating and sustain such adhesion through operation in the electrolytic cell.

Generally speaking, aluminum is produced by electrolysis of aluminum compounds, such as aluminum oxides or salts, in a molten salt bath. Such usually concerns situating the molten salt between an anode and cathode and passing current through the cap between the anode and cathode. One of the more prominent of such baths is the fluoroaluminate bath ($AlF_3$-$NaF$-$CaF_2$) used in the well-known Hall cell. Another type of bath is the chloroaluminate type used in other cells ($AlCl_3$-$NaCl$-$LiCl$-$KCl$-$MgCl_2$) such as is described in U.S. Pat. No. 3,755,099. In electrolytic cells for the production of aluminum, it is common for the anode to be vertically spaced from the cathode such that the current passes in a generally vertical direction through the bath. The anode can be a baked carbon block and the cathode, as seen by the salt bath, is liquid aluminum. Current passes from the anode through the salt bath to the liquid aluminum cathode and thence to the supporting media beneath the liquid aluminum (typically the bottom of the cell). The cells may be monopolar, such as depicted in U.S. Pat. Nos. 3,400,061 and 4,071,420, or they can be bipolar, such as depicted in U.S. Pat. No. 3,755,099, all of which are incorporated herein by reference.

One problem in the operation of such electrolytic cells in producing aluminum is the desire to increase the power efficiency in operating the cell. This could be accomplished by decreasing the distance between the anode and the cathode, thus lessening the electrical resistance within the cell. However, such disturbs the liquid aluminum cathode and causes it to vary in thickness, thus limiting the anode-cathode spacing to that which safely accommodates the highest waves in the liquid aluminum cathode without short-circuiting.

It is recognized in the art that the use of refractory hard metals, such as titanium diboride, as a cathode surface in such cells offers significant advantages since the $TiB_2$ surface is readily wettable by liuid aluminum. This then permits the cathode surface to be drained of liquid aluminum and eliminates the problems caused by electromagnetic disturbance of a deeper or thicker aluminum pool and enables achieving reduced anode-to-cathode distances and improved power efficiencies. However, achieving a dependable titanium diboride cathode surface has often been difficult and quite expensive. Not only is titanium diboride very expensive, but is suffers from sensitivity to thermal stress encountered in heating a cell to start production. Composites of carbon and $TiB_2$ including $TiB_2$-coated carbon have been tried but results to date have been disappointing. For instance, $TiB_2$ coatings can be penetrated and undermined by molten aluminum thus destroying the coating integrity.

SUMMARY OF THE INVENTION

In accordance with the invention, an improved cathode surface is provided by depositing a titanium diboride or other refractory hard metal coating on a graphite substrate using deposition techniques, such as chemical vapor deposition. It is important that the refractory hard metal coating should include a region of dense columnar grain structure which has been found to markedly reduce penetration of the coating. It is also important that the substrate be graphite rather than ordinary carbon because of the superior thermal and electrical conductivity and resistance to thermal shock of graphite. The higher electrical resistance of ordinary carbon tends to offset to a degree the hoped-for decrease in electrical resistance across a cell. It is also important that the graphite substrate have carefully controlled structural features to enhance titanium diboride coating adhesion and sustaining that adhesion through use in the hostile electrolytic cell environment and the high bath velocities encountered. In accordance with the invention, the graphite substrate may be produced by compacting a green carbon body with or without working to impart thereto a grain direction. Further controls are placed on the manufacture and structural features such that the resulting graphite, after graphitization, has a density within the range of 1.6 to 1.85 grams per cubic centimeter (g/cc) and that its coefficient of thermal expansion is close to that of the refractory hard metal such that the coefficient for the refractory hard metal divided by that for the graphite ranges from 0.7 to 1.4, preferably 0.9 to 1.1. One practice of the invention also includes orienting the refractory hard metal coated graphite such that its grain direction is the same as that of current flow within the cell. The type of graphite employed in practicing the invention is usually considered inferior to the more dense types for use as a cathode material especially in Hall-type cells and its superiority as a substrate for a refractory hard metal coating is surprising. Not only does the use of a refractory hard metal coating save costs over a solid body thereof, the use of a supposedly inferior and less expensive graphite substrate can further this cost reduction.

Accordingly, it is an object of the present invention to provide an improved cathode electrode in electrolytic cells for producing aluminum or other metals comprising a graphite substrate and a coating of a refractory hard metal which is especially useful where the cathode projects outwardly from a molten metal pool into the electrolyte toward the anode.

Another object is to provide for selectively controlling the manufacture and structure of the graphite substrate in such a cathode electrode to facilitate adhesion of such refractory hard metal coating and sustaining such adhesion and such coating through extended periods of operation in such electrolytic cell.

These and other objects will be apparent from the drawings, specification and claims appended hereto.

DETAILED DESCRIPTION OF THE INVENTION

Figure 1:
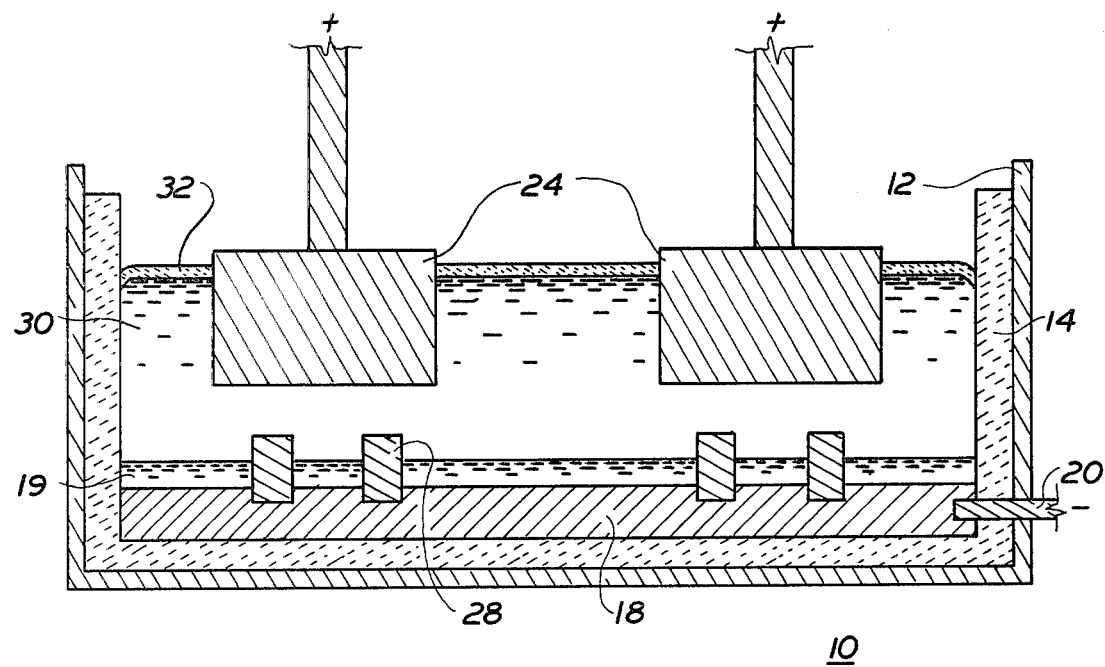
FIG. 1 is a schematic sectional elevation of an electrolyte cell useful for producing aluminum.
Figure 2:
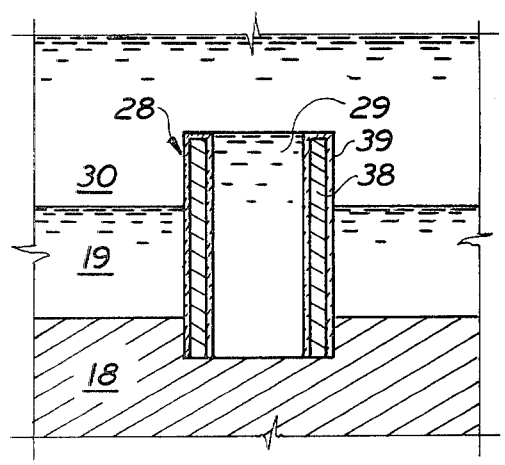
FIGS. 2 and 3 are elevation views in cross section illustrating embodiments of the improved electrode in accordance with the invention.
Figure 3:
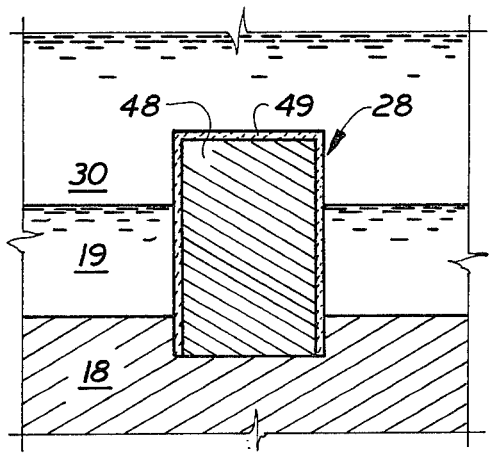

A suitable cell for producing aluminum in accordance with the invention is illustrated schematically in FIG. 1. The cell comprises an outer steel shell 12 lined with a refractory or insulative material 14. Within the lower region of the shell is situated a cathode bottom or base member 18 which is connected electrically to a cathode collector bar system 20. The cathode base 18 is typically constructed of graphite or other electrically conductive material. Above the cathode is situated one or more anodes 24 which are connected to a provision for voltage drop between the anode and cathode. The cell contains an electrolyte 30 and usually has a surface crust 32 which serves to contain heat and prevent atmospheric attack. Upon the cathode base 18 rests a pool 19 of molten aluminum. In the normal operation of a conventional Hall cell, this pool functions as the cathode electrode as seen by the electrolyte bath 30. However, in one preferred embodiment of the invention, refractory hard metal coated graphite upstanding bodies 28 protrude out of the cathode base 18 and into the molten aluminum pool 19 or even extending through the molten aluminum pool 19 and into the overlying salt electrolyte bath 30 toward the anode 24, as depicted in FIG. 1. This latter arrangement as shown in FIG. 1 sets the anode-to-cathode distance as the vertical distance between the upper surface of cathode insert 28 and the bottom surface of anode 24. This distance can be as little as ¾ inch or ½ inch or even less, for instance ¼ inch and less is feasible. The distance by which the upstanding cathode members 28 project above the molten aluminum pool 19 should be at least ½ inch or ¾ inch minimum and preferably at least 1 inch, for instance 2 inches. While two such bodies 28 are shown in FIG. 1 for each anode 24, a greater plurality may be used. A preferred practice of the invention features providing the cathode members 28 as upstanding vertical hollow cylinders or pipes, such as depicted in U.S. Pat. No. 4,071,420, incorporated herein by reference. The provision of such hollow pipe-like cathode bodies 28 enables each pipe-like body to hold some molten aluminum and the pipe and the molten aluminum pool within the pipe combine to serve as a cathode. This is illustrated in FIG. 2 which shows such a cathode member 28 embedded in the cathode bottom 18 and containing a small pool of molten aluminum 29 extending above the main aluminum pool 19 contacting the base cathode 18. The cathode body 28 comprises a graphite core 38 and a refractory hard coating 39. In operation, molten aluminum is deposited from the bath upon the surface of cathode extension 28 and of the molten metal pool 29 contained therewithin the flows over into the main aluminum pool 19. An alternative embodiment is shown in FIG. 3 which shows a cathode member 28 embedded in the cathode bottom 18 and comprising an upright solid graphite cylinder 48 coated with refractory hard metal 49. This embodiment offers certain advantages with respect to ease of coating with the refractory hard metal.

The particular arrangement of protruding cathode member extensions 28 depicted in FIGS. 1 through 3 is preferred in practicing the invention as simplifying retro-fitting of the invention into existing and older Hall-type cells. In these arrangements the protruding cathode members 28 can be set into the graphite cathode bottom 18 sealed or in sufficient contact therewith for conducting electric current from the protruding cathode member 28 through the cathode bottom 18 and to the cathode collector bar system 20. However, the invention is not necessarily intended to be limited to such and can even be applied to a much larger or monolithic cathode member, such as that depicted in U.S. Pat. No. 3,400,061. Such a cathode could be arranged for continuous draining to remove the molten aluminum deposited thereon and provide a continuously replenished aluminum film thereon.

Referring again to FIG. 1, the electrolyte 30 may be a fluoroaluminate type containing aluminum fluoride, sodium fluoride and calcium fluoride of the type conventionally used in Hall cells for electrolytically reducing alumina ($Al_2O_3$) to produce aluminum. Also, the electrolyte 30 may be of the chloroaluminate type containing aluminum chloride, sodium chloride, lithium chloride, potassium chloride and magnesium chloride for producing aluminum electrolytically from $AlCl_3$. Also, the cell may be monopolar, as shown in FIG. 1, or it may be of the bipolar type, such as that depicted in U.S. Pat. No. 3,755,099.

The improved cathode electrode member, specifically referring to the core or substrate portion 38 in FIG. 2 and 48 in FIG. 3, is fashioned from graphite as now described. The graphite is made from graphite grade carbon which can be derived from coke produced from coal or petroleum. It can also be particulate graphite matter. In the case of petroleum coke, such is typically calcined at a temperature of about 800° to about 1600° C. in order to drive off volatile impurities before proceeding with the further steps in producing graphite although this calcining step can be omitted. The coke or carbon is blended with a pitch binder to provide a mixture having a pitch content of about 10% to 30% and compacted with or without working to provide a green body. The green carbonaceous body can be worked such as by extrusion or rolling to reduce its cross-sectional size and produce a distinct orientation of grains in the direction of working. It is preferred in one embodiment that the green carbonaceous body be worked to a cross-sectional reduction of at least 3 to 1 and preferably 8 to 1. This tends to assure a directional grain pattern wherein grains have a major axis, at least twice either minor axis, which tends to align in the direction of working. At this point the shaped green body can be cut into sections to provide two or more electrode members. The electrode members are baked at about 700° to 1000° C. to drive off volatiles remaining from the pitch binder. The baked electrode members are then immersed to impregnate them with liquid pitch which increases the density of the baked piece, after which the baking is repeated to drive off volatiles. In the normal manufacture of graphite, this pitch impregnation and baking cycle is repeated one or more times since such repeated treatments tend to increase density. However, in practicing the invention, it is important that this densification practice be conducted so as to achieve the desired density in the final graphitized material of between 1.60 and 1.85 grams per cubic centimeter (g/cc). In order to assure such, it is preferred to limit the pitch impregnation treatments somewhat, for instance to a single such treatment.

In the manufacture of the pipe-like shaped electrodes of the type depicted in FIG. 2, such shape is cut from the electrode material after the first baking and prior to the pitch impregnation. A fairly long tube can be provided for coating with a refractory hard metal and then cut in two and installed in the cell with the coated end facing upwardly. The machining of the pieces should preferably be conducted so as to keep the axis or other suitable dimension of the electrode member aligned with the direction of working and the grain orientation.

Referring to the pitch impregnation step, one practice of the invention concerns adding to the pitch very finely divided particles of refractory hard metal. This is believed to enhance the subsequent coating with refractory hard metal and its adhesion to the graphitic substrate. Another embodiment of the invention concerns treating the graphitized material with a suspension of refractory hard metal in a suitable vehicle, for example a titanium diboride suspended in a low viscosity coal tar pitch. These treatments can be vacuum or pressure assisted. Still another practice concerns mixing the refractory hard metal in finely divided form with the particulate carbonaceous material used in making the graphite. The mixing can be done as dry mixtures or by adding to the initial pitch binder finely divided particles of the refractory hard metal, or both. An important consideration in these preferred embodiments is to impart to the basic graphite structure a substantial degree of impregnation by the refractory hard metal. However, this has to be balanced against cost considerations and a suitable compromise reached.

After densification, the baked electrode material is graphitized at a typical temperature of about 2000° to 3100° C., and preferably 2050° to 2400° or 2500° C. It may be useful to clarify differences or distinctions between baking and graphitizing as they apply to heating carbonaceous bodies and making graphite. Baking is normally done by heating a carbonaceous body, either in unitary or particulate form, for the purpose of driving off volatiles, such as components in the pitch used in binding or densifying a carbonaceous body. In the baking process, temperature is gradually increased to allow for the evolution of the volatiles and to allow the shrinkage which occurs in the baking operation to proceed gradually so as to avoid cracking. Baking temperatures normally range from about 700° to about 1000° C. although higher temperatures can be employed, and the operation can be referred to as baking or sometimes as calcining. Calcining for the most part applies to particulates or raw material, whereas the baking term usually applies to a green compact comprising particulate carbonaceous material and a pitch-type binder wherein baking converts the pitch binder into coke to provide solids bonds with the filler materials. The baking operation is normally carried out in a conventional convection-type furnace heated by gas or oil with the heat input to the carbon being by indirect heat transfer. The entire heating cycle in baking is somewhat time consuming, and can take from a week or two up to a month or more. Baking typically results in substantial shrinkage through loss of volatiles. However, there is no significant change in the carbonaceous internal structure achieved in baking, and the structure continues to appear as amorphous or as containing crystallites of such small size as to make the structure appear or at least behave like an amorphous structure.

Graphitization is readily distinguished from baking in that it is done at somewhat higher temperatures and produces drastic and easily observed changes in the internal structure but without drastic changes in density, as contrasted with baking as just described. In graphitizing, the temperatures employed range from about 1800° or 2000° to 2100° up to 3000° C., with the more typical temperatures ranging from about 2400° or 2500° C. to 3000° C. as these temperatures are usually associated with the higher quality grades of graphite. This heating occurs over a time period typically of about two weeks. The heating is done in a non-oxidizing atmosphere and by passing electric current directly through the graphite so as to heat the graphite internally and directly by its own electrical resistance, with the graphite itself thus providing the electric resistive heating element, as opposed to the more conventional furnace and heating employed in baking. While graphitizing does not drastically change the density of the carbonaceous materials, it drastically alters and rearranges the internal structure, which, after graphitizing, can no longer be considered amorphous. To the contrary, the resulting graphite structure exhibits the classic and well-known graphitic structural arrangement comprising parallel plates or platelets of flat, hexagonal arrays of carbon atoms.

To illustrate some of the differences in internal structure in comparing graphite with carbon, the $d_{002}$ and $L_c$ dimensions are useful. The "c" dimension applies to the crystal or crystallite size in the "c" direction, the direction normal to the basal plane, and the $d_{002}$ dimension is the interlayer spacing. These dimensions are normally determined by x-ray diffraction techniques. R. E. Franklin defines amorphous carbon having an interlayer spacing ($d_{002}$) of 3.44 Å and crystalline graphite of 3.35 Å. (*Acta Crystallographica*, Vol. 3, p. 107 (1950); *Proceedings of the Royal Society of London*, Vol. A209, p. 196 (1951); *Acta Crystallographica*, Vol. 4, p. 253 (1951).) During the process of graphitization, the amorphous structure of carbon is changed to the crystalline structure of graphite which is shown by an increase in the $L_c$ dimension and a decrease in the $d_{002}$ dimension. In carbon, the $L_c$ dimension normally ranges from 10 to about 100 Angstrom units (Å) or a little less, whereas, most graphite typically exhibits $L_c$ dimension of greater than 350 or 400 Å, that is typically from over 400 Å to about 1000 Å. There is another substantially graphitic structure wherein $L_c$ is between about 100 Å or a little more up to about 350 or 400 Å or a little less, and this is sometimes referred to as "semi-graphite" having the same general plate-like shape and configurations as graphite in its structure but differing some from the normal x-ray diffraction pattern for graphite. Both graphite structures have a $d_{002}$ dimension less than 3.4 Å whereas carbon has a $d_{002}$ dimension greater than 3.4 Å. In general graphitizing at temperatures of about a little over 2000° C. or 2050° C. up to about 2350° or 2400° C. tends to produce the "semi-graphite" structure whereas temperatures over 2400° C. tend to produce the "normal" graphite structure.

Another practice in producing carbonaceous electrodes is to employ particulate graphite as the starting material to which the pitch is added and the mixture compacted, impregnated and baked. However, while this baked carbonaceous material contains graphite it is not constituted of graphite as a unitary graphite structure. In practicing the invention, it is important to provide the graphite substrate as such a continuous unitary graphite by graphitizing after shaping and compacting so as to assure the proper combination of electrical and thermal conductivity, coefficient of expansion and stability properties. More importantly, in cathodes of the type shown in the drawings comprising upwardly protruding cathode elements 28 where aluminum is substantially continuously running over a substantially vertical surface (a surface within 20° or 30° of vertical), any non-graphite carbonaceous material on or beneath such a surface can rapidly deteriorate and the cathode member 28 likewise deteriorate rapidly and can even fall apart. Thus in practicing the invention it is quite important that the carbonaceous portion of the upstanding cathode electrode members 28 be constituted of substantially unitary graphite.

The coefficient of thermal expansion (CTE) of the titanium diboride and the graphite are advantageously brought as close as practical into alignment or correspondence in practicing the invention. In the temperature range here of concern (25° C. to 950° C.) most $TiB_2$ has a CTE within a general range of about 6 to $11 \times 10^{-6}$/°C., with the CTE in the direction of the major crystal axis, the "A" direction or "horizontal" direction, being about 6 to $8 \times 10^{-6}$/°C. and in the transverse direction, the "C" or "vertical" direction, being about 8 to $11 \times 10^{-6}$/°C. The mean CTE for most $TiB_2$ would fall within a general range of about 8 to $9 \times 10^{-6}$/°C. Graphite, on the other hand, can vary relatively widely from a CTE of about $1 \times 10^{-6}$ to about $8.5 \times 10^{-6}$ or more in/in/°C., with most grades having rather low CTE levels of less than 3 or $4 \times 10^{-6}$ in/in/°C. It is preferred in practicing the invention to balance the respective CTE's of $TiB_2$ and graphite such that the ratio of the CTE for $TiB_2$ divided by that for graphite equals approximately 0.7 to 1.4, preferably 0.9 to 1.1, more preferably 0.9 to 0.99, and to use those types of graphite having CTE levels of from about 5.9 to about 7.7 or 7.8 or even $8.3 \times 10^{-6}$ in/in/°C. One preferred embodiment of the invention concerns use of graphite having a CTE of 7.8 to $8.3 \times 10^{-6}$ in/in/°C.

Achieving the desired higher CTE levels in graphite can be enhanced by using modest to low graphitization temperatures of 2050° or 2100° to 2400° or 2500° C. Graphitizing at higher temperatures can lead to CTE values in the neighborhood of $4 \times 10^{-6}$ (per °C.) as are characteristic of most commercial grades of graphite. This use of such relatively low graphitization temperatures produces two advantages in practicing the invention in that it favors higher CTE levels while favoring lower density levels. Another factor in achieving high CTE levels is the proper selection of the coke for producing the graphite. In general, the isotropic coke, albeit more expensive, tends to favor a higher CTE in the final graphite product than acicular or non-acicular coke. It is thus sometimes preferred to use isotropic coke or mixtures thereof with acicular and non-acicular coke in practicing the invention, and, accordingly, preferred embodiments of the invention employ a coke comprising isotropic coke, for instance at least 50 or 60% or more isotropic coke, more preferably at least 70 or 80% isotropic coke in producing the graphite substrate. However, mixtures containing as little as 10 to 40% isotropic coke may be useful in practicing the invention, although on a less preferred basis, but it has to be remembered that such has certain cost advantages since the acicular and non-acicular grades of coke usually cost less than the isotropic grade. Nonetheless, the preference of higher isotropic coke content, even amounts as high as 90% or more and even 100% isotropic coke, can outweigh the extra cost of the isotropic coke where the shape of the electrode member has relatively large surface areas in more than one plane.

For instance, referring to FIG. 3, the electrode member 28 can be a right circular cylinder about three inches in diameter and four or five inches high, having relatively large surfaces on both its top face and its cylindrical side face. On the other hand, the pipe-like arrangement shown in FIG. 2, which can be a similar size right cylinder, having a wall thickness of only ¼ inch, has large vertical surfaces but a much smaller horizontal surface. The FIG. 3 arrangement could be expected to be more sensitive to directional differences in thermal expansion properties and thus, in some instances, the use of relatively high levels, 60 to 70%, of isotropic coke in providing such electrode bodies could be advantageous. The pipe-like configuration of FIG. 2, however, would be more tolerant of more directional differences in CTE, and in these embodiments, the electrodes should be arranged in the electrolytic cell with the grain direction corresponding with the direction of current flow. In most Hall-type cells this would be the vertical direction.

When using 100% isotropic coke, it is possible to achieve a graphite having substantially isotropic properties. In producing such graphite from isotropic coke, the coke can simply be compacted into a shape approximating the final shape or a larger body from which the final shape can be cut without working the body as by extrusion. Alternatively, where the isotropic coke is mixed with other coke having directional properties, or even where essentially all isotropic coke is used, the grain body can be worked such as by extruding, and such working can establish or align grain direction within the entire mixture, and such can sometimes be used to advantage especially where the cathode member is of a pipe-like shape as shown in FIG. 2.

Examples of commercial grades of graphite suitable in practicing the invention are listed below:

| Manufacturer | Grade | Density (g/cc) | CTE (per °C.) |
|---|---|---|---|
| Poco Graphite Inc. | ACF-10Q | 1.78 | $8.3 \times 10^{-6}$ |
| Poco | AXF | 1.80 | $7.9 \times 10^{-6}$ |
| Poco | AXM-5Q and 9Q | 1.79 | $7.3$–$7.7 \times 10^{-6}$ |
| Stackpole | L-31 | 1.66 | $6.0 \times 10^{-6}$ |
| Airco-Speer | SX-5 | 1.73 | $6.0 \times 10^{-6}$ |

The term "refractory hard metal" as used herein refers to the carbides, borides, silicides and nitrides of the transition metals in the fourth to sixth groups of the periodic table and which are wettable by molten aluminum under electrolytic cell operating conditions and relatively insoluble in molten aluminum and in molten electrolyte and having at least moderate electrical conductivity and dimensional stability. The preferred refractory hard metals are the borides of titanium and zirconium such as $TiB_2$.

A preferred method of imparting the refractory hard metal coating to the graphite cathode electrode member is chemical vapor deposition. One such approach includes the reduction by hydrogen of the chlorides of both titanium and boron in accordance with the work of T. M. Bessmann and K. E. Spears appearing in the *Journal of the Electrochemical Society*, Volume 124, Issue No. 5 (1977) at page 786, incorporated herein by reference. Prior to coating with titanium diboride, it is preferred that the graphite substrate be properly cleaned to provide a surface free of loose or contaminated material.

Chemical vapor deposition from boron trichloride and titanium tetrachloride can be effected over a temperature range of 800° to 1100° C. with a temperature of 925° C. being suitable. The heating operation should be carried out in a nonoxidizing or inert atmosphere, such as argon, in order to preserve the receptivity of the surface to titanium diboride deposition. The boron trichloride and titanium tetrachloride reactants and the hydrogen are introduced into the chamber after the graphite reaches proper temperature. The hydrogen can be employed to carry the titanium tetrachloride to the chamber. It is preferred that the reactants be allowed to blend or mix prior to being introduced into the heated chamber in order to place proper proportions of each reactant at the heated graphite surface. A suitable mixture of reactants would be about 3 parts titanium tetrachloride, about 9 parts boron trichloride and about 100 parts hydrogen by volume. While chemical vapor deposition is a preferred method for achieving a refractory hard metal coating, other methods are also believed to be useful such as plasma flame spraying, electrochemical deposition and slurry deposition. After chemical vapor deposition coating, the electrodes are advantageously heated to temperatures within the general range of 1800° to 2500° C.

In practicing the invention, coatings of 0.030 to 0.035 inch are generally adequate, although coatings of up to 0.050 inch or even more may be desired for certain situations. A typical coating thickness in practicing the invention would range from about 0.010 or 0.015 inch to about 0.045 or 0.050 inch. The foregoing coating thickness dimensions are largely based on the cathode configurations as shown in FIGS. 2 and 3 and where a use period of about 3 or 4 years at typical production rates is anticipated before tearing down the cell for rebuilding. However, as production rates, useful cell life between periods of rebuilding, cathode configuration and surface area are changed, the desirable coating thickness for the refractory hard metal also may change. Accordingly, one embodiment of the invention includes selecting a thickness for the refractory hard material coating which is equal to or greater than the thickness determined in accordance with the following equation:

$$t = \frac{(S)(M)}{(D)(A)}$$

where
t = coating thickness (cm)
S = mass saturation solubility of the refractory hard metal in aluminum (grams/gram) (0.000026 for $TiB_2$)
D = density of $TiB_2$ coating (gram/$cm^3$)
M = total aluminum mass produced during the antipated or predicted use period for the cell or cathode members (grams)
A = total surface area of $TiB_2$ coating ($cm^2$)

A preferred practice of the invention includes achieving a dense preferably columnar structure in the $TiB_2$ or other refractory hard metal coating, by which is meant a tightly interconnected array of elongate or columnar grains. The columnar structure grain orientation is not as critical as the presence of the dense columnar structure itself which is highly resistant to penetration or undermining by molten aluminum. Thus the invention utilizes a relatively dense refractory hard metal coating on a graphite substrate which, in the arena of high quality electrode grade graphite, is considered somewhat porous in that the required density range of 1.6 to 1.85 g/cc is somewhat less than that considered more characteristic of higher quality dense graphite which characteristically exhibits a density of 1.95 or 2 grams per cubic centimeter.

EXAMPLE

Short pipe-like electrode members of the type depicted in FIG. 2 were produced from graphite and coated with $TiB_2$ for testing in an electrolytic cell to determine the effectiveness of the $TiB_2$ coating. Electrode members were $3\frac{1}{2}$ inches in outside diameter by 2 inches long having a wall thickness of $\frac{1}{2}$ inch and were machined from graphite bar stock having a density of 1.8 g/cc and a coefficient of thermal expansion which varied from piece to piece between 7.9 and $8.3 \times 10^{-6}$ in/in/°C. which provided a ratio over the CTE for $TiB_2$ which ranged between about 0.98 and 1.4. The axis of the electrode was aligned with the direction of extrusion such that the grains when viewed in FIG. 2 would be vertical which would be the direction in which the current passes. The electrode members were coated with $TiB_2$ by chemical vapor deposition and the coating was observed to be dense and relatively pore-free and was observed to exhibit a columnar structure across its thickness. The thickness of the $TiB_2$ coating varied between 0.0105 to 0.015 inch on the outside surface and between 0.017 to 0.028 inch on the inside surface with the thickness being about 0.020 inch on the end surface. Several of these pipe-like electrode members were tested in a small Hall cell with a bath composition of 95% $Na_3AlF_6$ (bath ratio $NaF/AlF_3 = 1.1$), 5% $CaF_2$ with $Al_2O_3$ fed continuously which was operated at an anode current density of about 6.5 amps/sq. inch with a spacing between the anode and the pipe-like cathode members of only $\frac{1}{2}$ inch. The cell was operated for 100 hours at 960° C. with the aluminum product being tapped daily. After the test period, the pipe-like electrode members were removed and sectioned. Careful analysis revealed no sign of aluminum penetration of the $TiB_2$ coating and no aluminum carbide formation. There was no spalling or fractures of the coating or any other sign of undermining of the coating by molten aluminum. This is considered a reliable indication of coating integrity since in prior tests the $TiB_2$ coating would be undermined and spall and reveal aluminum carbide formation at the coating-graphite interface. The careful control of the coefficient of expansion, careful selection of the graphite having the proper characteristics, together with achieving a dense and preferably columnar structure in the $TiB_2$ coating result in greatly increased electrode life which thus enables operating an electrolytic cell at low resistance by using short cathode-anode distance and achieving this condition of operation in an economical less costly fashion by the use of graphite electrodes coated with $TiB_2$ as opposed to the much more expensive solid $TiB_2$ electrode.

In examining the sectioned electrode members, the $TiB_2$ coating was carefully studied. It was found that it was not absolutely necessary to have the dense columnar structure extend completely across the $TiB_2$ coating thickness but that at least some portion of the thickness, preferably at least 0.015 inch thick, should have the dense columnar structure. It was observed that if this structure prevailed at some band below the $TiB_2$ outer surface, aluminum could penetrate inwardly to the band but was stopped by that band. Hence, it is a preferred practice to continue the chemical vapor deposition until at least 0.015 inch of the coating is of the dense columnar structure since this provides a high degree of resistance to penetration by molten aluminum.

While the invention has been described with particular reference to aluminum production, it is believed to be useful in producing other metals.

While the invention has been described in terms of preferred embodiments, the claims appended hereto are intended to encompass all embodiments which fall within the spirit of the invention.

What is claimed is:

1. A method for the production of metal in an electrolytic cell comprising electrolyzing a bath comprising a compound of the metal dissolved in a molten solvent by passing electric current between one or more anodic and one or more cathodic surfaces to produce said metal which collects upon a base cathode surface, wherein the improvement comprises providing one or more cathode surfaces extending outwardly from said base cathode surface toward each anode, said cathode surfaces comprising a refractory hard metal coating on a graphite substrate, said graphite substrate being provided by graphitizing carbonaceous material to produce a substantially unitary and continuous graphite structure having a density of 1.6 to 1.85 grams per cubic centimeter and a coefficient of thermal expansion ranging from 0.7 to 1.4 times that of the refractory hard metal coating, said graphite exhibiting a directional grain pattern which is substantially aligned parallel to the overall direction of current flow in said electrolytic cell, said refractory hard metal coating being deposited upon said graphite substrate by chemical vapor deposition effected to provide a dense columnar structure describing a substantially continuous band within said refractory hard metal coating.

2. The method according to claim 1 wherein said refractory hard metal is selected from the borides of titanium and zirconium.

3. The method according to claim 1 wherein said refractory hard metal is titanium diboride.

4. The method according to claim 1 wherein said refractory hard metal coating is from 0.01 to 0.05 inch thickness on said graphite substrate.

5. The method according to claim 1 wherein said refractory hard metal is titanium diboride said coating being 0.015 to 0.05 inch thick and including said dense columnar structure through at least 0.015 inch of said coating, said dense columnar structure substantially describing a substantially continuous band within said coating.

6. The method according to claim 1 wherein said extending composite cathode surface region extends from said base cathode toward the anode and into a molten metal pool between the base cathode and the electrolyte bath, but not extending into said bath.

7. The method according to claim 6 wherein a plurality of such protruding cathode surfaces is provided for each anodic surface.

8. The method according to claim 1 wherein said extending composite cathode surface region extends from said cathode and toward said anode and through a molten metal pool between the base cathode and the electrolyte bath and into said bath.

9. The method according to claim 8 wherein a plurality of such protruding cathode surfaces is provided for each anodic surface.

10. The method according to claim 1 wherein said electrolytic cell is a Hall type cell and said cell bath is a fluoroaluminate type and wherein alumina is electrolytically reduced to produce aluminum which collects as a molten pool upon said base cathode, and wherein a plurality of said composite cathode surface regions corresponds to each anode surface, said composite cathode surface regions extending outwardly from said cathode base toward said anode surface and into said molten aluminum pool.

11. The method according to claim 1 wherein said electrolytic cell is a Hall type cell and said cell bath is a fluoroaluminate type and wherein alumina is electrolytically reduced to produce aluminum which collects as a molten pool upon said base cathode, and wherein the electric current is passed through said bath from one or more anodes to a plurality of said composite cathode surface regions corresponding to each anode surface, said composite cathode surface regions extending outwardly from said base cathode toward said anode surface and through said molten aluminum pool and into said cell bath.

12. The method according to claim 11 wherein said cathode surface regions comprise one or more hollow bodies protruding out of said molten metal pool and containing molten aluminum.

13. The method according to claim 11 wherein said cathode surface regions comprise one or more closed bodies projecting from said molten metal pool.

14. The method according to claim 1 wherein said metal is aluminum.

15. The method according to claim 1 wherein said graphite substrate is impregnated with refractory hard metal prior to receiving said refractory hard metal coating.

16. The method according to claim 15 wherein said impregnation of refractory hard metal is effected prior to graphitization during impregnation of carbonaceous stock with pitch by suspending the refractory hard metal in the pitch.

17. The method according to claim 1 wherein said graphite has a coefficient of thermal expansion of 5.9 to 8.3 in/in/°C. and from 0.9 to 1.1 times that of the refractory hard metal.

18. The method according to claim 1 wherein said graphite is derived from at least 25% isotropic coke.

19. The method according to claim 1 wherein said graphite is derived from at least 50% isotropic coke.

20. The method according to claim 1 wherein said graphite is graphitized at a temperature between about 2050° C. and about 2500° C.

21. The method according to claim 1 wherein said graphite is graphitized at a temperature between about 2100° C. and about 2400° C.

22. A method for the production of aluminum in an electrolytic cell comprising electrolyzing a molten fluoroaluminate salt bath containing aluminum oxide dissolved therein by passing electric current between one or more anodic and one or more cathodic surfaces to electrolyze said bath therebetween to produce molten aluminum which collects beneath said salt bath as a molten aluminum pool wherein the improvement comprises providing one or more cathode surfaces protruding from a cathode base beneath said molten aluminum pool and through said pool and into the overlying salt bath for electrolyzing said salt bath between said anodic and said protruding cathode surfaces, said protruding cathode surfaces comprising a boride coating selected from the borides of titanium and zirconium on a graphite substrate, said graphite substrate being provided by working and graphitizing carbonaceous material to produce a graphite having a density of 1.6 to 1.85 grams per cubic centimeter and a directional grain orientation which is aligned with the direction of overall anode-cathode current movement in said electrolytic cell, said graphite having a coefficient of thermal expansion ranging from 5.9 to 8.3 in/in/°C. and from 0.9 to 1.1 times that of said boride coating, said graphite exhibiting a directional grain pattern which is substantially aligned with the direction of current flow in said electrolytic cell, said boride coating having a thickness of 0.01 to 0.05 inch and exhibiting a dense columnar structure through at least 0.01 inch of thickness substantially describing a substantially closed band within said coating.

23. The method according to claim 22 wherein said cathode surface is provided in the form of one or more hollow bodies protruding out of said molten metal pool and containing molten aluminum.

24. The method according to claim 22 wherein said graphite is derived from at least 25% isotropic coke.

25. The method according to claim 22 wherein said graphite is derived from at least 50% isotropic coke.

26. The method according to claim 25 wherein said graphite is graphitized at a temperature between about 2050° C. and about 2500° C.

27. The method according to claim 22 wherein said graphite is graphitized at a temperature between about 2100° C. and about 2400° C.

28. The method according to claim 22 wherein said refractory hard metal is deposited on said graphite substrate by chemical vapor deposition.

29. The method according to claim 22 wherein said refractory hard metal is titanium diboride and is deposited on said graphite substrate by chemical vapor deposition.

30. The method according to claim 22 wherein said graphitization is effected at temperatures between about 2050° and 2500° C. and the graphite structure so produced exhibits an $L_c$ dimension between over 100 Å and less than 400 Å and a $d_{002}$ dimension less than 3.4 Å.

31. The method according to claim 22 wherein said protruding cathode surfaces extend to within ¾ inch of the anode electrode.

* * * * *

UNITED STATES PATENT AND TRADEMARK OFFICE
CERTIFICATE OF CORRECTION

PATENT NO. : 4,308,115
DATED : December 29, 1981
INVENTOR(S) : Perry A. Foster, Jr. et al.

It is certified that error appears in the above-identified patent and that said Letters Patent are hereby corrected as shown below:

| | |
|---|---|
| Col. 1, line 11 | Before "fluoroaluminate", change "of" to --or--. |
| Col. 1, line 23 | Before "between", change "cap" to --gap--. |
| Col. 1, line 25 | Before "NaF", change "Alf$_3$" to --AlF$_3$--. |
| Col. 1, line 55 | Before "aluminum", change "liuid" to --liquid--. |
| Col. 1, line 63 | After "but", change "is" to --it--. |
| Col. 2, lines 66-67 | Before "cell", change "electrolyte" to --electrolytic--. |
| Col. 3, line 57 | Before "flows", change "the" to --and--. |
| Col. 4, line 33 | After "to", delete "about". |
| Col. 6, line 3 | Before "2100°", change "to" to --or--. |

UNITED STATES PATENT AND TRADEMARK OFFICE
CERTIFICATE OF CORRECTION

PATENT NO. : 4,308,115                                   Page 2 of 2

DATED : December 29, 1981

INVENTOR(S) : Perry A. Foster, Jr. et al.

It is certified that error appears in the above-identified patent and that said Letters Patent are hereby corrected as shown below:

Col. 11, line 63          Before "cathode", add --base--.
Claim 8

Col. 14, line 3           After "claim", change "25" to --22--.
Claim 26

Signed and Sealed this

Twenty-second Day of June 1982

[SEAL]

Attest:

GERALD J. MOSSINGHOFF

Attesting Officer          Commissioner of Patents and Trademarks